United States Patent [19]

Yu

[11] Patent Number: 5,722,270
[45] Date of Patent: Mar. 3, 1998

[54] STEERING WHEEL LOCK WITH ALARM

[76] Inventor: Chien-Ho Yu, No. 253-59, Kang-Kou, Kang-Kou Tsun, An-Ting Hsiang, Tainan Hsien, Taiwan

[21] Appl. No.: 824,781

[22] Filed: Mar. 26, 1997

[51] Int. Cl.$^6$ .................................. B60R 25/02
[52] U.S. Cl. ...................... 70/209; 70/226; 70/DIG. 49
[58] Field of Search ................................ 70/209, 211, 212, 70/225, 226, 237–239, DIG. 49, DIG. 57; 180/287; 340/426

[56] References Cited

U.S. PATENT DOCUMENTS

| | | | |
|---|---|---|---|
| 1,429,334 | 9/1922 | Furber | 70/211 |
| 4,829,797 | 5/1989 | Wu | 70/237 X |
| 5,055,823 | 10/1991 | Fuller | 70/212 X |
| 5,097,685 | 3/1992 | Lien | 70/211 X |
| 5,222,381 | 6/1993 | Wilcox | 70/237 X |
| 5,353,615 | 10/1994 | Chen | 70/226 X |
| 5,400,627 | 3/1995 | Liao | 70/209 |
| 5,426,960 | 6/1995 | Jan | 70/209 |
| 5,428,976 | 7/1995 | Weng et al. | 70/209 |
| 5,435,158 | 7/1995 | Ta-Yung | 70/209 |
| 5,440,908 | 8/1995 | Lin | 70/237 X |
| 5,609,050 | 3/1997 | Yu | 70/209 |

FOREIGN PATENT DOCUMENTS

| | | | |
|---|---|---|---|
| 652858 | 2/1963 | Italy | 70/237 |

*Primary Examiner*—Lloyd A. Gall
*Attorney, Agent, or Firm*—Varndell Legal Group

[57] ABSTRACT

A steering wheel lock with alarm including a shaft connecting two lateral plates of a lock body and fitted with a reset spring, and a speaker base provided with structure for preventing sound muffling being secured at a lower rim of the lock body. By the reset spring, the lateral plates will automatically reset to a released position after the lock is unlocked so as to prevent inadvertent pressing of the lateral plates to actuate the alarm. The speaker base is provided with pins of different heights and ribs thereon for preventing thieves from muffling the alarm sound.

2 Claims, 3 Drawing Sheets

STEERING WHEEL LOCK WITH ALARM

BACKGROUND OF THE INVENTION

The present invention is related to a steering wheel lock with alarm, and more particularly to an improvement on the steering wheel lock described in U.S. Ser. No. 08/616,338, U.S. Pat. No. 5,609,050 filed by the inventor of the present invention.

In the lock device described in U.S. Ser. No. 08/616,338, lateral plates are used to lock a lock body to a steering wheel to restrict the rotation of the steering wheel. A sleeve linking up with the lateral plates is used to control an alarm means to generate sound. However, such a structure has the drawback that, when the lateral plates are released from a locked position by the turning of the key, the lateral plates may actuate the alarm system when they are turned. Besides, the speaker base has a planar surface and is exposed on the outside so that thieves may cover up the speaker with their palms or circular or cylindrical objects so as to muffle or lower the alarm sound. The anti-theft effects are therefore not very ideal.

SUMMARY OF THE INVENTION

A primary object of the present invention is to provide an improved steering wheel lock with alarm with better anti-theft effects.

According to a first aspect of the present invention, a shaft connecting the lateral plates of a lock body is fitted with a reset spring, the reset spring having one end secured at the shaft with the other end secured inside the lock body, such that when the lateral plates are released from a locked position, the lateral plates will automatically reset to an unlocked position to prevent inadvertent actuation of the alarm.

According to a second aspect of the present invention, the side of the speaker base exposed to the outside is provided with a plurality of pins of different heights and a plurality of ribs so as to prevent thieves from covering up the speaker with their hands or cylindrical objects to lower or muffler the alarm sound.

According to a third aspect of the present invention, positioning posts extend from the sides of the lock body to restrict the angles of the turning of the lateral plates when they reset so as to prevent the lateral plates from turning about an excessive angle, which may affect the effect of the alarm.

According to a fourth aspect of the present invention, the screws locking the speaker base to the lock body are concealed by the lateral plates when the lateral plates are in a locked position to prevent access thereto by thieves.

According to a fifth aspect of the present invention, the lateral plates are disposed at both sides of the steering wheel to define a space therebetween so that the lateral plates may be fitted onto the periphery of the steering wheel to prevent thieves from severing the steering wheel.

DETAILED DESCRIPTION OF THE PREFERRED EMBODIMENT

Figures 1, 2:
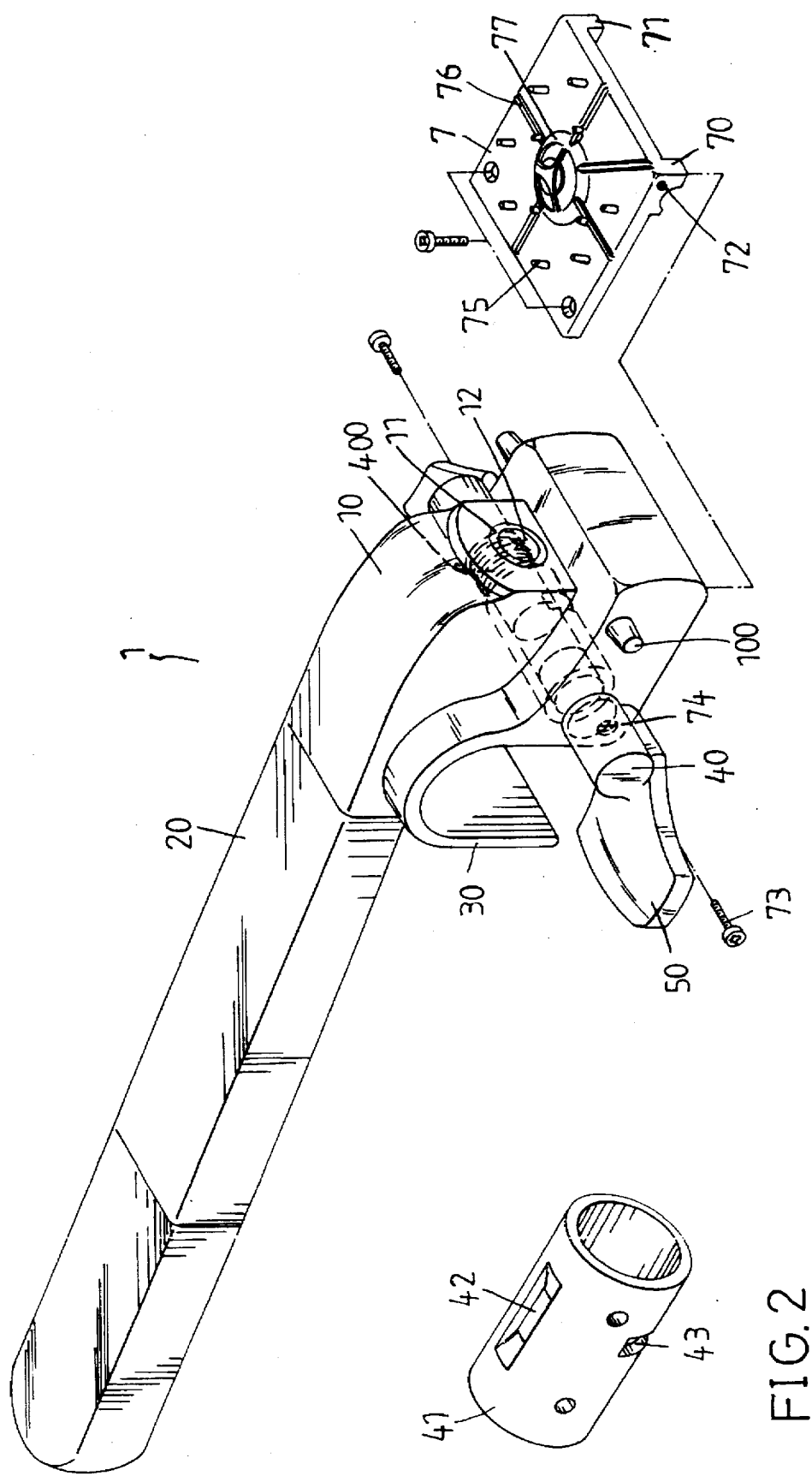
FIG. 1 is an elevational exploded view of the present invention.
FIG. 2 is an elevational view of a sleeve of the present invention.

With reference to FIG. 1, a steering wheel lock 1 according to the present invention for locking the steering wheel essentially comprises a lock body 10, a stop lever 20, and casing 30, a shaft 40, two lateral plates 50, and an alarm circuit means.

The lock body 10 has a cylinder 11 which accommodates the core parts therein with a keyway 12 exposed on the outside. A key may be inserted into the keyway 12 to control the action of the cylinder 11. Two restricting rods 100 respectively extend from the sides of a lower rim of the lock body 10.

The stop lever 20 extends from a periphery of the lock body 10 for checking the rotation of the steering wheel.

The casing 30 is fixedly provided below the lock body 10 and is formed by two lateral walls extending upwardly joined at the upper ends. The lower portion and the sides are hollowed out for covering part of the spokes of the steering wheel.

The shaft 40 is passed through a lower rim of one of the lateral walls of the casing 30 and through the two end portions of the lateral wall to project therefrom. One end of the shaft 40 is fitted with a reset spring 400, and the central portion of the shaft 40 is fixedly provided with a sleeve 41 (as shown in FIG. 1). The sleeve 41 is, as shown in FIG. 2, provided with a positioning hole 42 disposed in a transverse direction for matching a positioning rod 13 of the cylinder 11 so that the positioning rod 13 may be inserted therein for positioning purposes (as shown in FIGS. 3 and 4).

The lateral plates 50 are fixedly connected to the respective ends of the shaft 40 and may synchronously rotate with the shaft 40. When the lateral plates 50 are turned to the lower side they may contact the other side wall of the casing 30, the shaft 40 will be controlled by the cylinder 11 to become positioned.

The alarm circuit means is installed inside the lock body 10. See FIGS. 3 and 4. The speaker connected to the alarm circuit means is fixedly disposed in a speaker base 7 at the lower rim of the lock body 10. A rear rim of the speaker base 7 extends to form two projecting blocks 70 and 71, each of which is provided with a screw hole 72. By means of screws 73 passing through the two lateral screw holes 74 of the lock body 10, the speaker base 7 may be locked at a bottom side of the lock body 10, such that a plurality of pins 75 and ribs 76 on the upper side of the speaker base 7 are exposed from the bottom side of the lock body 10.

Figure 4:
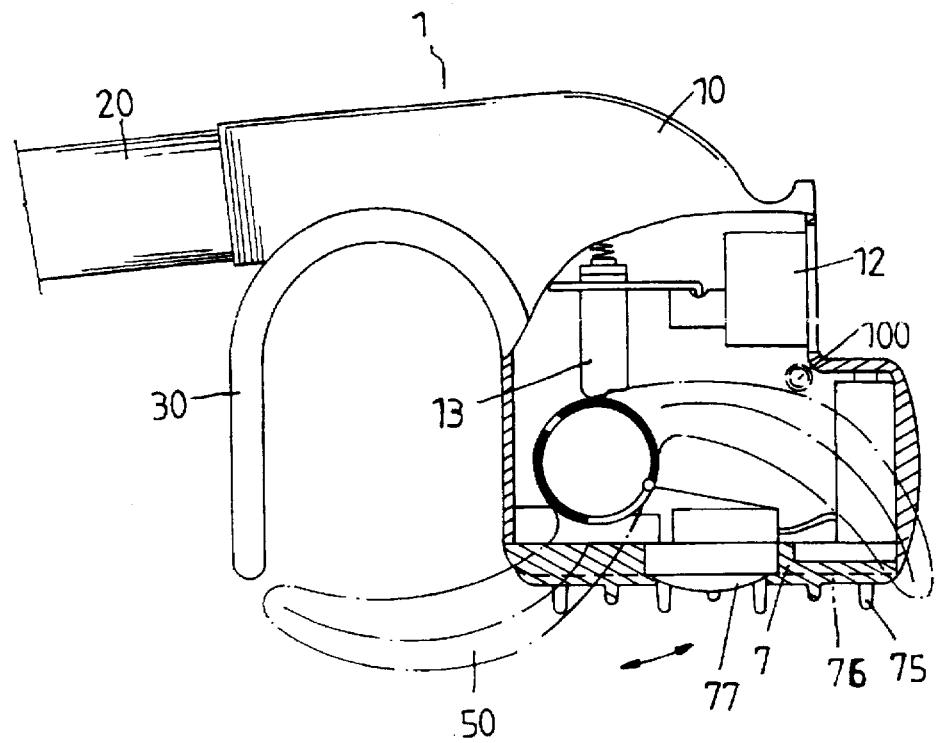
FIG. 4 is a schematic view illustrating the operation of the present invention.
Figure 3:
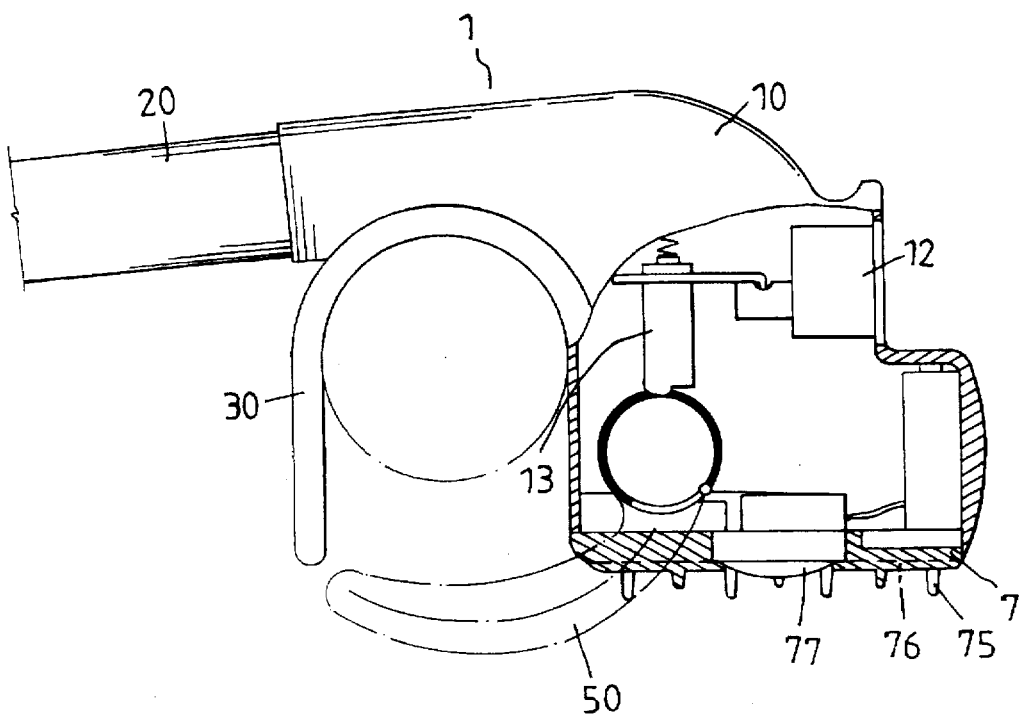
FIG. 3 is a sectional view of the present invention.
Figure 6:
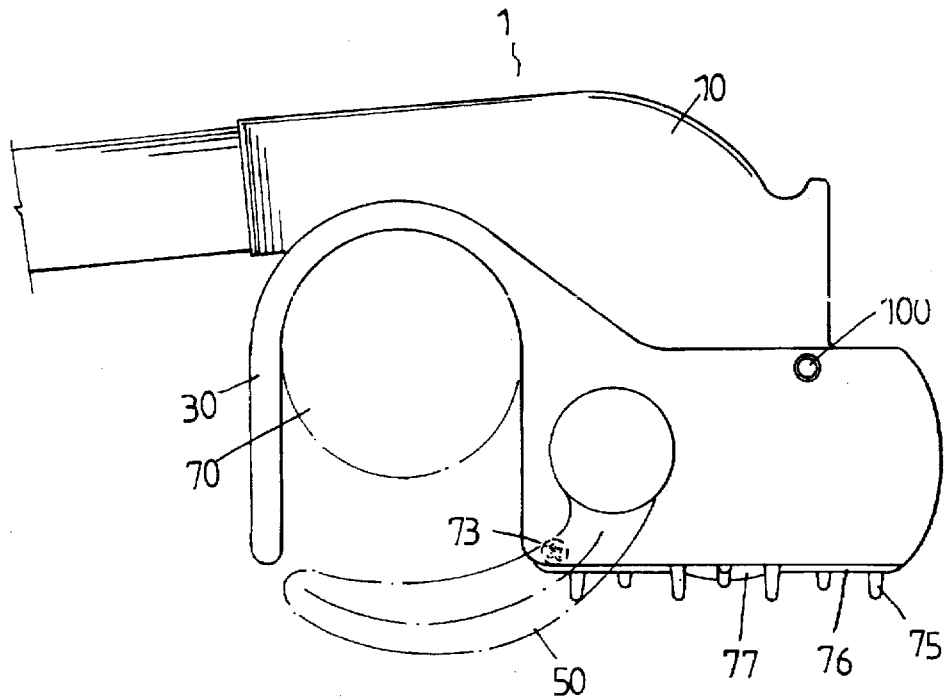
FIG. 6 is a schematic view illustrating the present invention in a locked position.

From FIGS. 3 and 4, it can be seen that the improvement of the present invention comprises essentially the arrangement of the reset spring 400 fitted on the shaft 40 connected to the lateral plates 50 so as to utilize the resilience of the reset spring 400. When the lateral plates 50 are released from a locking position by the turning of the key, the lateral plates 50 will be forced to return to an unlocked position due to the reset spring 400. At the same time, the restricting rods 100 extending from the sides of the lower rim of the lock body 10 will restrict the angle through which the lateral plates 50 turn when they are being reset, as shown in FIG. 4.

Figure 5:
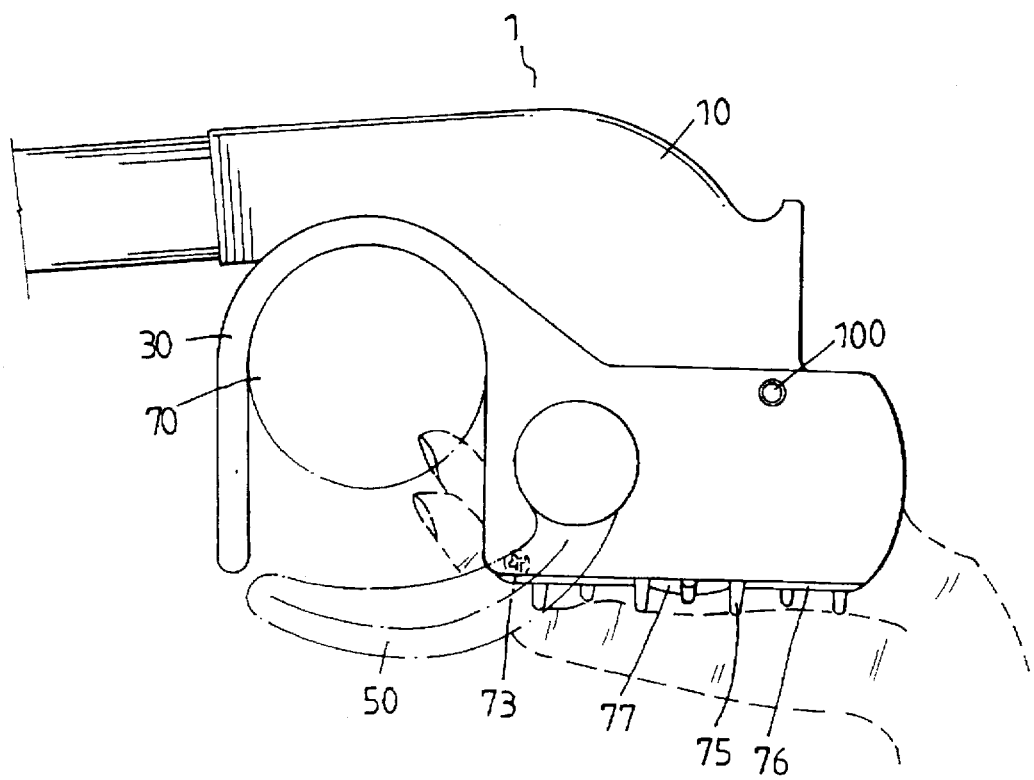
FIG. 5 is a schematic view illustrating the effect of the present invention in the prevention of sound lowering or muffling.

Furthermore, with reference to FIG. 5, a protrudent protective cover 77 is formed at the outer rim of a speaker mounting slot. The pins 75 and ribs 76 are disposed around the protective cover 77. By configuring the pins 75 to have different heights, thieves are prevented from covering up the speaker with their palms. The ribs 76 are provided to prevent thieves from muffling the speaker with cylindrical objects. In addition, in order to facilitate replacement of battery and ensure security, the securing screw holes 74 of the speaker base 7 are disposed at the two sides of the lock body 10 so that, when the lateral plates 50 lock the steering wheel, the lateral plates 50 are in such a position as shielding the securing screw holes 74. On the contrary, when the lock is opened, the screw holes 74 are exposed to allow replacement of a battery.

Although the present invention has been illustrated and described with reference to the preferred embodiment thereof, it should be understood that it is in no way limited to the details of such embodiment but is capable of numerous modifications within the scope of the appended claims.

I claim:

1. A steering wheel lock with alarm, comprising: a lock body having a cylinder; a stop lever extending from a periphery of said lock body; a casing fixedly disposed below said lock body; a shaft passing through a side wall of said casing and having a sleeve fixedly provided at a central portion thereof, said sleeve having a positioning hole for receiving a portion of said cylinder; a pair of lateral plates fixedly connected to the respective ends of said shaft for synchronous rotation with said shaft; and an alarm circuit means installed inside said lock and connected to a speaker disposed on a speaker base which is locked to a lower rim of said casing by means of screws, wherein said shaft is fitted with a reset spring having one end secured to said sleeve with the other end fixedly disposed inside said lock so as to allow said lateral plates, which are linked-up with said shaft, to automatically abut two restricting rods at both sides of said casing when said lateral plates are released from a locking position, thus preventing inadvertent actuation of the alarm circuit means during unlocking.

2. A steering wheel lock with alarm as claimed in claim 1, wherein a plurality of screw holes are provided at a rear rim of said speaker base while corresponding screw holes are provided at both sides of said casing such that, when said lateral plates are in a locked position, said screw holes are all concealed from sight and shielded by said lateral plates.

* * * * *